US005267470A

United States Patent [19]

Cook

[11] Patent Number: 5,267,470

[45] Date of Patent: Dec. 7, 1993

[54] PRESSURE SENSOR MOUNTING FOR CANISTER PURGE SYSTEM

[75] Inventor: John E. Cook, Chatham, Canada

[73] Assignee: Siemens Automotive Limited, Chatham, Canada

[21] Appl. No.: 876,254

[22] Filed: Apr. 30, 1992

[51] Int. Cl.[5] ........ G01M 3/26

[52] U.S. Cl. ........ 73/49.7; 73/118.1; 123/520

[58] Field of Search ........ 73/49.7, 118.1; 123/518, 519, 520

[56] References Cited

U.S. PATENT DOCUMENTS 4,794,790 1/1989 Margarit-Metaxa et al. ..... 73/118.1 X
4,815,436 3/1989 Sasaki et al. ........ 123/520
4,862,856 9/1989 Yokoe et al. ........ 123/520 X
5,146,902 9/1992 Cook et al. ........ 73/118.1 X
5,158,054 10/1992 Otsuka ........ 123/520 X
5,191,870 3/1993 Cook ........ 123/520

FOREIGN PATENT DOCUMENTS 2635823 3/1990 France ........ 123/518

*Primary Examiner*—Herzon E. Williams
*Assistant Examiner*—Joseph W. Roskos
*Attorney, Agent, or Firm*—George L. Boller; Russel C. Wells

[57] ABSTRACT

An evaporative emission control system for an automotive vehicle comprises an integrated roll-over valve and vapor pressure sensor assembly mounted by means of a grommet in the top wall of the vehicle's fuel tank. The vapor pressure sensor forms part of an on-board diagnostic system for testing the integrity of the tank and vapor collection canister against leaks.

10 Claims, 1 Drawing Sheet

PRESSURE SENSOR MOUNTING FOR CANISTER PURGE SYSTEM

FIELD OF THE INVENTION

This invention relates to canister purge systems for automotive vehicles whose engines are powered by volatile fuel that is contained in vehicle-mounted fuel tanks.

BACKGROUND AND SUMMARY OF THE INVENTION

Canister purge systems for automotive vehicles which are powered by gasoline-fueled internal combustion engines are of course well known. The fuel tank's headspace is placed in communication with a vapor collection canister that collects volatile fuel vapors generated in the tank. The canister is selectively purged to the engine intake manifold under conditions conducive to purging. To minimize the potential for liquid fuel escaping the tank via the canister purge system in the event of an accident such as a vehicle roll-over, a roll-over valve is associated with the tank and canister to close the passage between them when such an event occurs. Such roll-over valve is typically mounted on the tank itself, and in addition to closing in response to tipping of the vehicle, and hence also of the fuel tank, beyond a certain range from the vertical, it also is buoyed closed if the liquid fuel in the tank rises to the valve.

Canister purge systems are now in the process of being equipped with on-board diagnostic systems. One type of on-board diagnostic system uses a pressure sensor for sensing pressure, either positive and/or negative, in the tank headspace.

The present invention relates to an improvement for the combination of such pressure sensing and roll-over closure functions in a single assembly for mounting on a fuel tank. The present invention makes use of the already existing requirement for an opening in a top wall portion of the tank to mount a roll-over valve, and consequently eliminates the need for an additional opening in the tank wall in order to communicate the pressure sensor to the tank headspace. The elimination of such an extra opening has obvious advantages for automotive vehicle manufacturers. A single sealing grommet is used to mount the assembly in a single opening in the tank wall. Furthermore, the invention offers the possibility for lower component and assembly costs because only a single component need be ordered and installed by the automotive vehicle manufacturer in order to incorporate both the pressure sensing function and the roll-over valve function.

Further features, advantages, and benefits of the invention, along with those just mentioned, will be seen in the ensuing description and claims. Drawings accompany the disclosure and illustrate a presently preferred embodiment of the invention according to the best mode contemplated at this time for carrying out the invention.

DESCRIPTION OF THE PREFERRED EMBODIMENT

Figure 1:
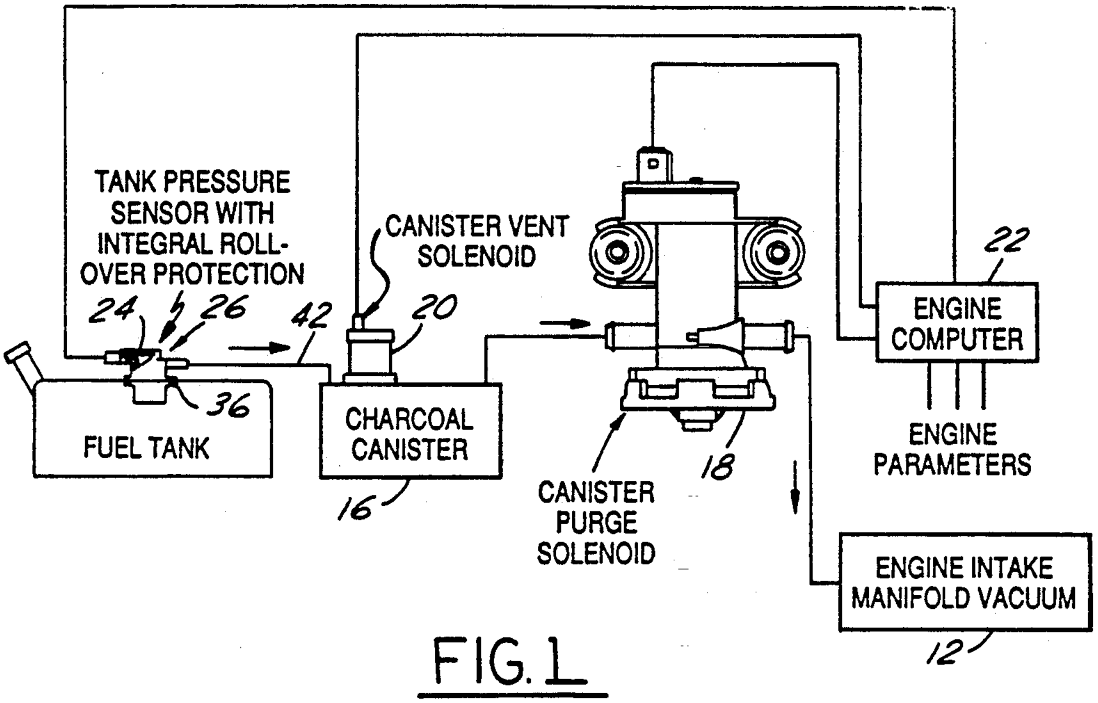
FIG. 1 is a diagrammatic view of an exemplary canister purge system with on-board diagnostics, including an assembly according to the present invention.

FIG. 1 shows an exemplary canister purge system 10 associated with a portion of an automotive vehicle engine's fuel system. The engine has an intake manifold within which engine intake manifold vacuum 12 is developed when the engine is running. The fuel system has a fuel tank 14 for holding a supply of volatile liquid fuel for the engine.

Canister purge system 10 comprises a vapor collection canister (charcoal canister) 16 and a regulated canister purge solenoid valve 18. A canister vent solenoid valve 20 is associated with canister 16. The engine control computer 22 controls solenoid valves 18 and 20 via respective electrical signals delivered to them. It includes a diagnostic system that allows the integrity of the tank and canister against leakage to be confirmed or denied.

The illustrated diagnostic system employs what is conveniently referred to as the vacuum method. This method involves computer 22 operating valve 20 closed and valve 18 open while the engine is running so that a certain vacuum is drawn in the headspace of tank 14 and canister 16. Valve 18 is then operated closed, and the vacuum thus drawn is monitored for a certain length of time to see if it decays, and if so, how much. More than a certain amount of decay within a certain time interval is deemed to deny the leak integrity of the tank and canister, while less than that amount is deemed to confirm the integrity. Further details of an exemplary vacuum method are disclosed in commonly assigned U.S. Pat. No. 5,191,870, issued Mar. 9, 1993.

Vacuum in the tank headspace and canister is measured by a pressure sensor. FIG. 1 shows such a pressure sensor 24 embodied in an integrated roll-over valve and pressure sensor assembly 26 that is mounted on the top wall of tank 14. Sensor 24 supplies to computer 22 an electrical signal representing vacuum in the tank headspace. Greater detail of assembly 26 appears in FIG. 2.

Assembly 26 comprises a body 28 having a generally cylindrical shape. An annular sealing grommet 30 of suitable elastomeric or synthetic, fuel-resistant material is disposed in a sealed manner around the outside of body 28, being axially captured by axially spaced walls of an annular radially outwardly open groove 32. The radially outer face of grommet 30 has a circular groove 34 via which grommet seats in a sealed manner in a circular hole 36 in the top wall of tank 14. Thus the mounting of body 28 on tank 14 is a fluid-tight one. As viewed in the drawings, that portion of body 28 below grommet 30 is disposed interior of the tank in the tank's headspace, while that portion of body 28 above grommet 30 is on the exterior of the tank.

Body 28 has an internal passage 38 that extends from the tank headspace and through a nipple 40. Nipple is connected by a conduit 42 with canister 16 to communicate the tank's headspace to the canister. A mechanism comprising a spring 44 and a valve element 46 is situated internally of body 28 within passage 38. This mechanism is assembled into passage 38 by insertion through the lower end of the passage and then assembling a cap 48 onto the lower end of body 28 as shown. This cap has openings that provide for flow through the passage, but it also has a seat for the lower end of spring 44.

Figure 2:
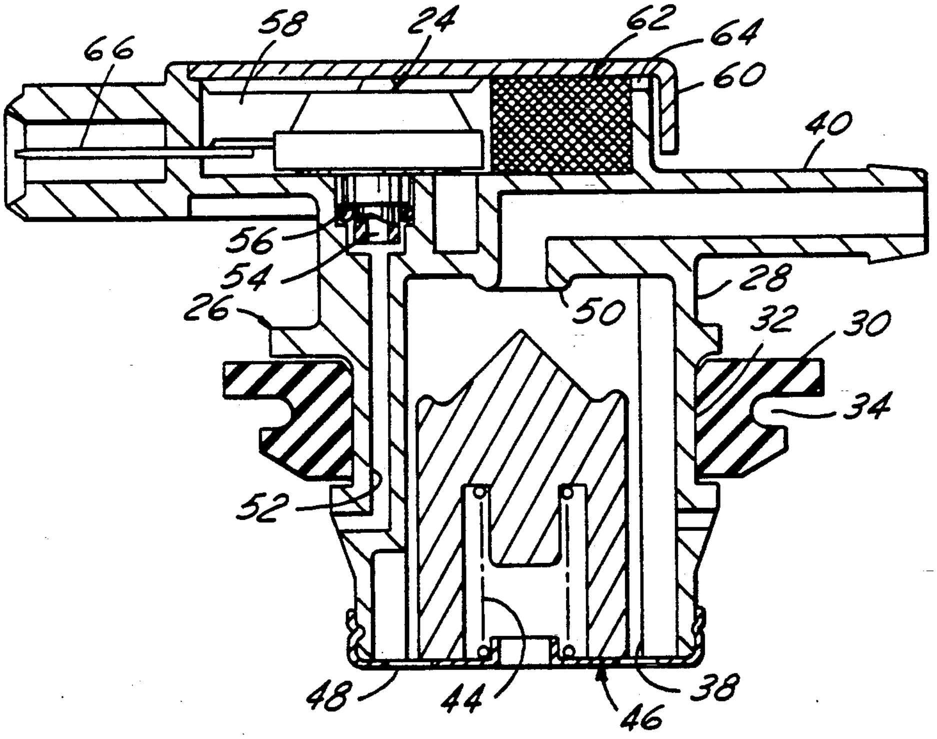
FIG. 2 is an enlarged vertical cross sectional view through the assembly of the present invention.

FIG. 2 shows assembly 26 vertically upright with valve element 46 in fully retracted position and with spring 44 in its most compressed condition. Tipping assembly 26 increasingly away from the vertical results in spring 44 increasingly pushing valve element 46 axially away from cap 48 until at and beyond a certain amount of tipping, the upper end of the valve element seats on a valve seat 50 closing passage 38 to flow. The mechanism has a certain buoyancy that is likewise responsive to the level of liquid fuel in the tank such that when that level rises to increasingly act on valve element 46, the valve element will increasingly lift away from cap 48 to seat on seat 50 and close passage 38. In this way, the roll-over valve function is incorporated into assembly 26.

The pressure sensing function is accomplished by providing a pressure sensing passageway 52 in body 28. The lower end of passageway 52 is open to the tank's headspace; the upper end comprises a receptacle into which is inserted the lower end of pressure sensor 24 which contains the sensor's pressure sensing port 54. An O-ring seal 56 is disposed between the two so that they fit together in a fluid-tight joint. In this way the tank's headspace is communicated to the pressure sensor's pressure sensing port in a leak-proof manner.

Adjacent the upper end of passageway 52 is an interior space 58 of body 28 that houses that portion of pressure sensor that is above the receptacle in the passageway into which the lower end of the pressure sensor is inserted. This interior space is enclosed by a cover 60 that fits onto the top of body 28.

Pressure sensor 24 also contains an atmospheric pressure sensing port which is communicated to outside atmosphere via a filter element 62 and an opening 64 to the exterior. Electrical terminals 66 extend from pressure sensor 24 and through a wall of body 28 to form a connector that is adapted to mate with a mating connector (not shown) that serves to connect the pressure sensor with computer 22.

In this way whatever pressure exists within the tank's headspace is communicated to the pressure sensing port of the pressure sensor while atmospheric pressure is communicated to its atmospheric port. The pressure sensor is effective to deliver a signal that represents the difference between the pressure at the two ports.

Thus, there has been described an assembly that integrates the pressure sensing and roll-over valve functions and that requires but a single hole in the tank wall. While any suitable pressure sensor may be used, one that measures both negative pressure (vacuum) and positive pressures may be advantageously employed. Such a sensor can be used for both vacuum method and pressure method diagnostic testing, the latter method being the subject of commonly assigned allowed U.S. Pat. No. 5,146,902, issued Sep. 15, 1992.

Having described a presently preferred embodiment, what is claimed as the invention is:

1. An automotive vehicle canister purge system comprising a vapor collection canister, a passage for communicating said vapor collection canister to headspace of a tank for holding a volatile fuel used to operate an internal combustion engine that powers such a vehicle, said passage comprising a roll-over valve that is open under a first set of conditions that allow tank/canister communication, those conditions comprising one or both of such tank being upright within a certain range of tilt from vertical and the level of liquid fuel in such tank being below a certain level, and that is closed under a second set of conditions that disallow tank/canister communication and thereby prevent any appreciable amount of liquid fuel from passing to said canister in the event that such a vehicle encounters an occurrence such as a roll-over, the latter conditions comprising one or both of such tank being tilted beyond said certain range of tilt and the level of liquid fuel in such tank rising to said certain level, said system further comprising means for purging said canister of collected fuel vapors to an intake manifold of such an engine in accordance with conditions of engine operation that are conducive to purging, said system further comprising a diagnostic means for subjecting both such headspace and a portion of said system that is in communication with such headspace, to leak testing, said diagnostic means comprising a vapor pressure sensor for sensing vapor pressure within such headspace, characterized in that said vapor pressure sensor is mounted on said roll-over valve and comprises a sensing port that is placed in communication with such headspace by a passageway that extends through a body portion of said roll-over valve, and sealing means sealing said vapor pressure sensor's sensing port to said passageway in a fluid-tight manner so that fluid communicated from such tank to said sensing port is sealed against leaking via said vapor pressure sensor's mounting on said body portion of said roll-over valve.

2. An automotive vehicle canister purge system as set forth in claim 1 characterized further in that said roll-over valve comprises a valve element that is disposed for motion within said body portion for allowing and disallowing flow through said passage, and in that said valve element does not interfere with the communication of said sensing port to such headspace provided by said passageway.

3. An automotive vehicle canister purge system as set forth in claim 1 characterized further in that said roll-over valve comprises an annular sealing grommet for mounting said body portion in a sealed manner in a through-hole in a wall portion of such a tank and in that said passageway passes internally through a portion of said body portion that passes through said grommet.

4. An automotive vehicle canister purge system as set forth in claim 1 characterized further in that said body portion comprises an interior space housing said vapor pressure sensor, said vapor pressure sensor has an atmospheric pressure sensing port for exposure to atmospheric pressure, a filter element via which said atmospheric pressure sensing port is communicated to atmosphere through an opening to atmosphere in said body portion is also housed within said interior space, and said vapor pressure sensor has electric terminal means passing through a wall of said body portion for delivering an electric signal representing the difference between the pressures sensed at said two ports.

5. An automotive vehicle that is powered by an internal combustion engine and has a fuel tank for carrying volatile liquid fuel consumed by said engine, and a canister purge system for purging fuel vapors generated in said tank to an intake manifold of said engine, said canister purge system comprising a vapor collection canister, a passage for communicating said vapor collection canister to headspace of said tank, said passage comprising a roll-over valve that is open under a first set of conditions that allow tank/canister communication, those conditions comprising one or both of said tank being upright within a certain range of tilt from vertical and the level of liquid fuel in said tank being below a certain level, and that is closed under a second set of conditions that disallow tank/canister communication and thereby prevent any appreciable amount of liquid fuel from passing to said canister in the event that said vehicle assumes encounters an occurrence such as a roll-over, the latter conditions comprising one or both of such tank being tilted beyond said certain range of tilt and the level of liquid fuel in such tank rising to said certain level, said system further comprising means for purging said canister of collected fuel vapors to said intake manifold in accordance with conditions of engine operation that are conducive to purging, said system further comprising a diagnostic means for subjecting both such headspace and a portion of said system that is in communication with such headspace, to leak testing, said diagnostic means comprising a vapor pressure sensor for sensing vapor pressure within such headspace, characterized in that said vapor pressure sensor is mounted on said roll-over valve and comprises a sensing port that is placed in communication with such headspace by a passageway that extends through a body portion of said roll-over valve, and sealing means sealing said vapor pressure sensor's sensing port to said passageway in a fluid-tight manner so that fluid communicated from such tank to said sensing port is sealed against leaking via said vapor pressure sensor's mounting on said body portion of said roll-over valve.

6. An automotive vehicle as set forth in claim 5 characterized further in that said roll-over valve comprises a valve element that is disposed for motion within said body portion for allowing and disallowing flow through said passage, and in that said valve element does not interfere with the communication of said sensing port to such headspace provided by said passageway.

7. An automotive vehicle as set forth in claim 5 characterized further in that said roll-over valve comprises an annular sealing grommet for mounting said body portion in a sealed manner in a through-hole in a wall portion of such a tank and in that said passageway passes internally through a portion of said body portion that passes through said grommet.

8. An automotive vehicle as set forth in claim 5 characterized further in that said body portion comprises an interior space housing said vapor pressure sensor, said vapor pressure sensor has an atmospheric pressure sensing port for exposure to atmospheric pressure, a filter element via which said atmospheric pressure sensing port is communicated to atmosphere through an opening to atmosphere in said body portion is also housed within said interior space, and said vapor pressure sensor has electric terminal means passing through a wall of said body portion for delivering an electric signal representing the difference between the pressures sensed at said two ports.

9. An integrated roll-over valve and vapor pressure sensor assembly for mounting by means of a grommet in a hole in a wall of a fuel tank bounding headspace of the tank, said valve comprising a body portion, a passage through said body portion, said passage having an inlet at one end that is intended to be disposed toward such tank headspace and an outlet end that is intended to be connected to a vapor collection canister, and a roll-over valve mechanism, including a selectively operable valve element, disposed in said passage for selectively opening and closing said passage depending upon one or both of the attitude of said body portion relative to vertical and the extent to which liquid fuel may act on said mechanism via said inlet, and a vapor pressure sensor mounted on said body portion and comprising a sensing port that is placed in communication with such tank headspace by a passageway in said body portion, and sealing means sealing said vapor pressure sensor's sensing port to said passageway in a fluid-tight manner so that fluid communicated from such tank to said sensing port is sealed against leaking via said vapor pressure sensor's mounting on said body portion.

10. An assembly as set forth in claim 9 in which said body portion comprises an interior space housing said vapor pressure sensor, said vapor pressure sensor has an atmospheric pressure sensing port for exposure to atmospheric pressure, a filter element via which said atmospheric pressure sensing port is communicated to atmosphere through an opening to atmosphere in said body portion is also housed within said interior space, and said vapor pressure sensor has electric terminal means passing through a wall of said body portion for delivering an electric signal representing the difference between the pressures sensed at said two ports.

* * * * *